I. SZARVASSY AND F. H. BENSEL.
PROCESS FOR THE PRODUCTION OF SOOT CARBON, RETORT GRAPHITE, AND OTHER CARBON PRODUCTS FROM NATURAL GAS.
APPLICATION FILED FEB. 14, 1921.
1,398,751. Patented Nov. 29, 1921.
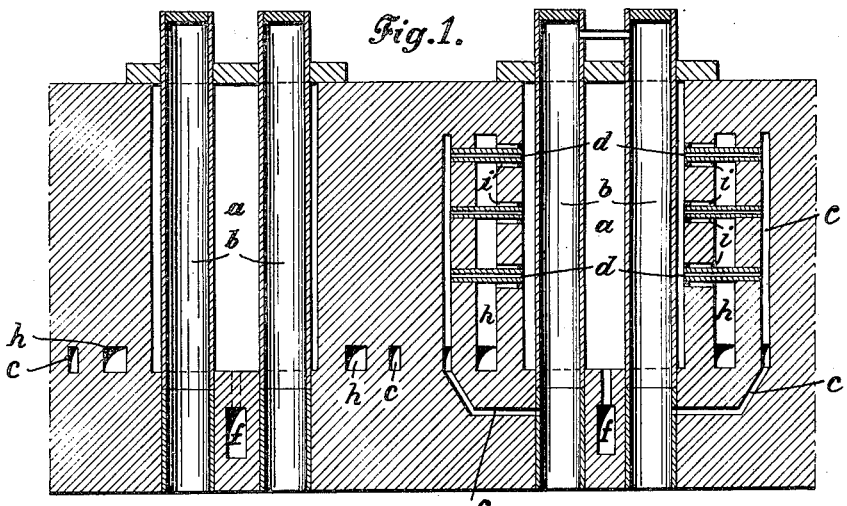
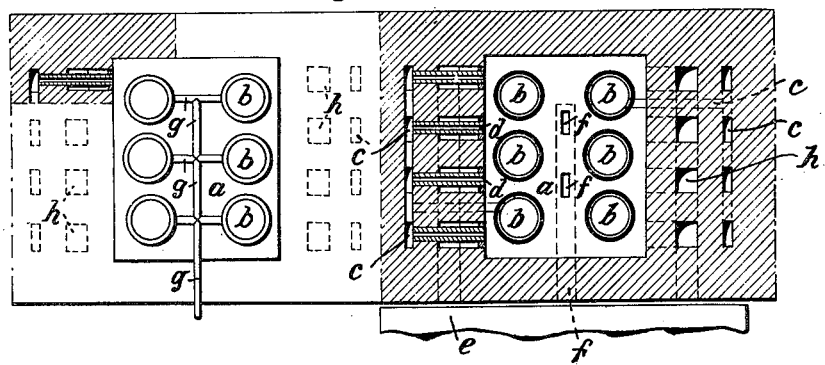
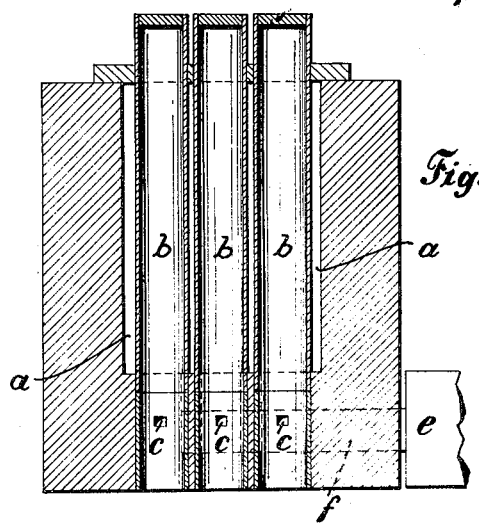

UNITED STATES PATENT OFFICE.

IMRE SZARVASSY, OF BUDAPEST, HUNGARY, AND FRITZ HEINRICH BENSEL, OF RATIBOR, GERMANY, ASSIGNORS TO RUTGERSWERKE AKTIENGESELLSCHAFT, OF BERLIN, GERMANY.

PROCESS FOR THE PRODUCTION OF SOOT-CARBON, RETORT-GRAPHITE, AND OTHER CARBON PRODUCTS FROM NATURAL GAS.

1,398,751.            Specification of Letters Patent.            Patented Nov. 29, 1921.

Application filed February 14, 1921. Serial No. 444,945.

*To all whom it may concern:*

Be it known that we, IMRE SZARVASSY, Hungarian citizen, and FRITZ HEINRICH BENSEL, German citizen, residing, respectively, at Budapest, Hungary, and Ratibor, Germany, have invented a certain new and useful Process for the Production of Soot-Carbon, Retort-Graphite, and other Carbon Products from Natural Gas, of which the following is a specification.

The known processes for the decomposition of natural gas to form soot-carbon, retort graphite and other carbon products are carried out on the retort being heated either by gas or by electricity. In the case of the gas furnace, the gas to be decomposed is used as fuel for heating the retort. The natural gas is decomposed at a temperature of from 1200° to 1500°. 1 cbm. of natural gas produces theoretically 0.538 kg. of carbon. Thus 1.86 cbm. of natural gas is necessary for the production of 1 kg. of carbon. According to the present method, in addition to the 1.86 cbm. of natural gas required for decomposition 4 to 4.5 cbm. are required for the heating of the retort, which shows that for the heating of the retort more gas is required than is introduced into the retort during the same unit of time. This process is therefore very uneconomical, and new experiments have shown that it is possible to employ for heating the retorts the quantity of gas which is left over after the decomposition of the natural gas, as combustion cannot completely be carried out in the retorts. It is also of advantage that the decomposition be intentionally not fully carried out, and that part of the gas be permitted to pass with the exhaust gases from the decomposing retorts into the combustion chamber. The experiments have further shown that in the production of 1 kg. of carbon, 3 cbm. of natural gas are consumed, and only about 65% of the gas is decomposed. Calorimetric experiments have shown that the combustion of a gas mixture produces about 19000 calories, therefore 1 cbm. produces about 6330 calories.

The quantity of heat required to decompose 1 cbm. of natural gas at a temperature of about 1200° is about 1620 calories. Taking into account that combustion takes place with a mixture in the proportion of about $\frac{1}{5}$ of air and that the temperature of the exhaust gas is about 150°, there is a further loss of heat of about 430 calories. The total heat consumed is therefore 1620+430=2050 calories. The quantity of heat present, as stated above, is about 6330 calories; therefore there remain for heat radiation and other losses 4000 calories. The above figures show that the exhaust gases by reason of their composition fully suffice to heat the decomposing retorts. By altering the velocity with which the natural gas is conducted through the retorts, it is possible in a simple manner to regulate the degree of decomposition of the natural gas and thereby to utilize for heating purposes the necessary quantity of gas left in the retort.

The great advantage of this method is that the natural gas utilized for heating purposes, coming from the heated retorts, already possesses a comparatively high temperature. Furthermore, the air required for combustion can, of course, be advantageously preheated in so-called recuperators by means of the exhaust gases from the combustion chamber. Thus according to the invention there is the most complete utilization of the heat and the natural gas itself can, before reaching the retorts, be heated by the exhaust gases from the combustion chamber, which means a saving of heat in the retorts that may be used for the decomposition of the natural gas.

In the drawing Figure 1 shows in cross section by way of example a form of construction of furnace for carrying out the process, Fig. 2 shows the cross section, and Fig. 3 the plan partly in section.

Within the furnace two or more retorts *b* are disposed, preferably in a vertical position, within a central combustion chamber *a*, which may be either circular or rectangular in cross section.

The natural gas to be decomposed is conveyed through lateral openings *g* (Figs. 1 and 3) to the retorts *b* which may be of fireclay, carbon, carbon mixture, silit or some other suitable substance. The decomposition of the natural gas commences from the heated walls of the retorts inward and the carbon separates itself in the retort and falls gradually to the bottom. After the greater part of the gases has been decomposed, the remainder, as well as the gases produced in the process of decomposition, are now conveyed either direct through the pipe $c$, or, through a gas reservoir, and through the nozzles $d$ to the combustion chamber $a$. The air required for combustion, which has been preheated in so-called recuperators $e$ by the exhaust gas (this gas being carried away from the combustion chamber $a$ through pipes $f$) is conveyed to the gas through the air pipes $h$ and through the nozzles $i$ of refractory material which lie beside the fuel nozzles $d$, in such manner that the air and gas mix together only after the gas enters the combustion chamber $a$. Further the sensible heat of the gases escaping from the combustion chamber can be utilized to heat the natural gas to be decomposed before the latter is conveyed through the pipes $g$ to the retorts $b$, thereby insuring a more speedy and better result.

We claim:

1. Process for the production of soot-carbon, retort graphite and other carbon products from natural gases, characterized in that the natural gas, which is continuously passed through the retorts, is decomposed to about 65%, and the natural gas which has not been completely decomposed is used in combination with the gases produced during the process of decomposition for heating the gas retorts.

2. A method of carrying out the process according to claim 1 characterized in that by altering the velocity with which the natural gas is conveyed through the retorts, the degree of decomposition of the natural gas can be regulated, thereby securing the necessary quantity of natural gas for heating purposes.

3. A method as set forth in claim 2 characterized in that in order to speed up the decomposition and thereby to reduce the period of heating the retorts, the natural gas is heated before entering the retorts by means of the exhaust gases from the combustion chamber.

IMRE SZARVASSY.
FRITZ HEINRICH BENSEL.